United States Patent
Cepulis et al.

(10) Patent No.: US 9,058,155 B2
(45) Date of Patent: Jun. 16, 2015

(54) ENCLOSURE POWER CONTROLLER PROVIDING PLURALITY OF POWER CONTROL SIGNALS TO PLURALITY OF REMOVABLE COMPUTE NODES BASED ON A DUTY CYCLE OF EACH POWER CONTROL SIGNAL

(75) Inventors: Darren J. Cepulis, Houston, TX (US); Chanh V. Hua, Houston, TX (US); Yasir Q. Hashmany, Houston, TX (US); Scott T. Christensen, Houston, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 441 days.

(21) Appl. No.: 13/375,138

(22) PCT Filed: Jun. 19, 2009

(86) PCT No.: PCT/US2009/047928
§ 371 (c)(1),
(2), (4) Date: Nov. 29, 2011

(87) PCT Pub. No.: WO2010/147596
PCT Pub. Date: Dec. 23, 2010

(65) Prior Publication Data
US 2012/0079299 A1    Mar. 29, 2012

(51) Int. Cl.
*G06F 1/26* (2006.01)
*G06F 1/32* (2006.01)
*G06F 1/18* (2006.01)

(52) U.S. Cl.
CPC .............. *G06F 1/189* (2013.01); *G06F 1/183* (2013.01); *G06F 1/26* (2013.01); *G06F 1/3203* (2013.01); *G06F 1/324* (2013.01); *Y02B 60/1217* (2013.01)

(58) Field of Classification Search
CPC . G06F 1/3203; G06F 1/3287; Y02B 60/1217; Y02B 60/1278; Y02B 60/1282
See application file for complete search history.

(56) References Cited

U.S. PATENT DOCUMENTS

| 7,043,647 | B2* | 5/2006 | Hansen et al. ................. 713/320 |
| 2004/0215986 | A1* | 10/2004 | Shakkarwar .................. 713/300 |
| 2005/0015632 | A1 | 1/2005 | Chheda et al. |
| 2005/0283624 | A1* | 12/2005 | Kumar et al. ................. 713/300 |
| 2006/0230299 | A1 | 10/2006 | Zaretsky et al. |

(Continued)

FOREIGN PATENT DOCUMENTS

CN        1969248 A    5/2007

OTHER PUBLICATIONS

Thaler, George J., "Automatic Control Systems," 1989, West Publishing Company, pp. 260-261.*

(Continued)

*Primary Examiner* — Thomas Lee
*Assistant Examiner* — Lin Lin Htay
(74) *Attorney, Agent, or Firm* — Conley Rose, P.C.

(57) ABSTRACT

A system and method for controlling power consumption is described herein. A computer system includes an enclosure. The enclosure is configured to contain a plurality of removable compute nodes. The enclosure includes a power controller configured to individually control an amount of power consumed by each of the plurality of removable compute nodes. The power controller provides a plurality of power control signals. Each power control signal is provided to and controls the power consumption of one of the plurality of removable compute nodes.

15 Claims, 2 Drawing Sheets

(56) References Cited

U.S. PATENT DOCUMENTS

| | | | |
|---|---|---|---|
| 2006/0259797 A1* | 11/2006 | Fung | 713/300 |
| 2007/0067656 A1 | 3/2007 | Ranganathan et al. | |
| 2007/0067657 A1* | 3/2007 | Ranganathan et al. | 713/320 |
| 2008/0184044 A1* | 7/2008 | Leech et al. | 713/300 |
| 2008/0208491 A1* | 8/2008 | Burlak et al. | 702/58 |
| 2009/0168843 A1* | 7/2009 | Waters et al. | 375/130 |
| 2010/0005321 A1* | 1/2010 | Miki | 713/300 |
| 2011/0182198 A1* | 7/2011 | Rittenhouse et al. | 370/252 |

OTHER PUBLICATIONS

International Searching Authority, The International Search Report and the Written Opinion, Mar. 17, 2010, 14 Pages.

* cited by examiner

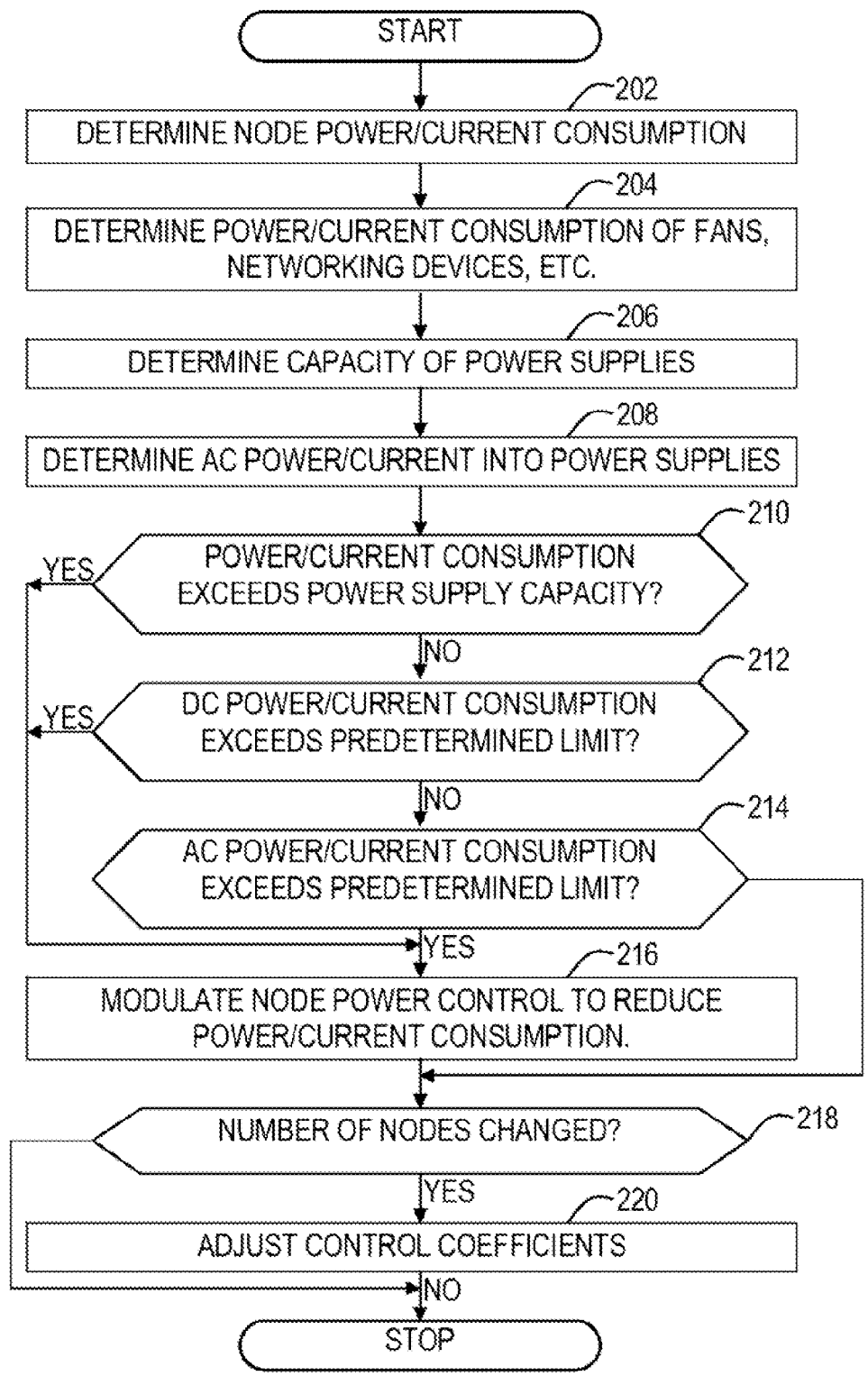

ENCLOSURE POWER CONTROLLER PROVIDING PLURALITY OF POWER CONTROL SIGNALS TO PLURALITY OF REMOVABLE COMPUTE NODES BASED ON A DUTY CYCLE OF EACH POWER CONTROL SIGNAL

BACKGROUND

Power management is an important issue for the information technology ("IT") industry. A single chassis can house multiple compute nodes and various peripheral devices such as storage and/or networking systems. The number and type of compute nodes housed in an enclosure can vary over time as nodes are installed and removed. These devices can be produced by any number of different manufacturers, and include a wide range of power management capabilities. Many available computing systems include no power metering or control mechanisms and are therefore excluded from IT power management solutions. As the density and capacity of compute nodes housed in an enclosure increases, power consumption, cooling capacity and associated energy costs and environmental impacts become significant concerns.

BRIEF DESCRIPTION OF THE DRAWINGS

For a detailed description of exemplary embodiments of the invention, reference will now be made to the accompanying drawings in which:

FIG. 2 shows a flow diagram of a method for centralized power control in a multi-node computer system in accordance with various embodiments.

NOTATION AND NOMENCLATURE

Figure 1:
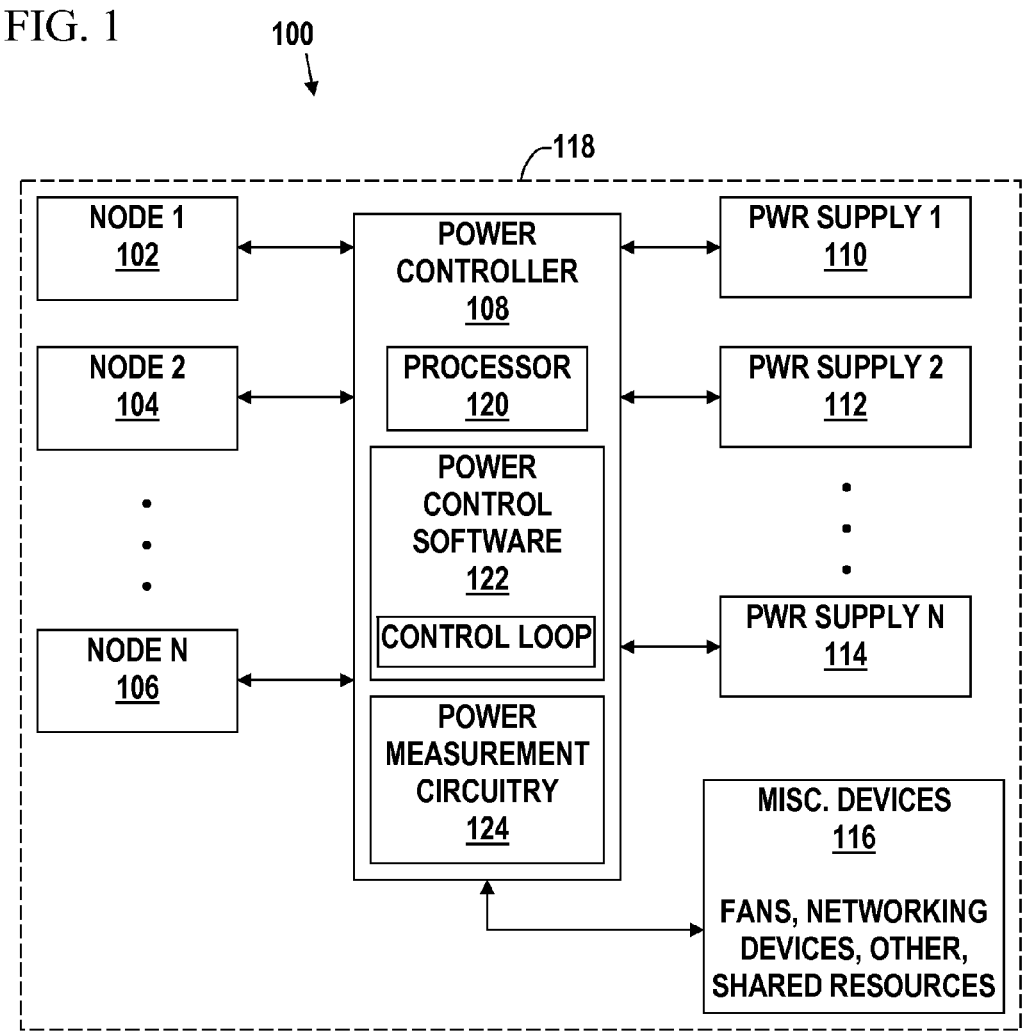
FIG. 1 shows a block diagram of a computer system including centralized power control in accordance with various embodiments.

Certain terms are used throughout the following description and claims to refer to particular system components. As one skilled in the art will appreciate, computer companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect, direct, optical or wireless electrical connection. Thus, if a first device couples to a second device, that connection may be through a direct electrical connection, through an indirect electrical connection via other devices and connections, through an optical electrical connection, or through a wireless electrical connection. Further, the term "software" includes any executable code capable of running on a processor, regardless of the media used to store the software. Thus, code stored in memory (e.g., non-volatile memory), and sometimes referred to as "embedded firmware," is included within the definition of software.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Measuring and controlling power consumption of a computing system including a variety of different types of computing and peripheral nodes can be difficult. Many available computing devices lack power metering or control mechanisms. Such devices may be excluded from any power management scheme implemented in a computing system. Embodiments of the present disclosure provide a centralized power measurement and control system that does not rely on power measurement and/or control capabilities embedded in individual computing nodes. Consequently, embodiments are capable of controlling the power consumption of compute nodes that lack power measurement circuitry. By measuring the power consumption of the compute nodes and other power consuming devices within an enclosure and controlling the power consumption of the compute nodes, embodiments of the present disclosure control the power consumed within the enclosure. Moreover, overall system cost is reduced because compute nodes need not include power measurement circuitry or power control software.

FIG. 1 shows a block diagram of a computer system 100 including centralized power control in accordance with various embodiments. The computer system 100 includes an enclosure 118. The enclosure 118 is configured to house a plurality of compute nodes 102, 104, 106, a plurality of power supplies, 110, 112, 114, and a centralized power control system 108. At least some embodiments of the computer system 100 can also include other miscellaneous devices 116, such as fans, networking devices (e.g., network switches, routers, hubs, gateways, etc.), and other shared resources such as data/program storage devices.

The enclosure 118 can be a chassis configured to house compute nodes 102, 104, 106 (such as blade computers or other computer based devices), and other computer related devices 116 (e.g., networking and/or storage devices). The enclosure 118 allows compute nodes 102-106 to be installed and/or removed from the enclosure in accordance with the needs of the system 100 and/or the user. Some embodiments of the enclosure 118 may be rack mountable, and some embodiments may be standalone.

The power supplies 110, 112, 114 provide power for the compute nodes 102-106 and other components housed in the enclosure 118. In at least some embodiments, the power supplies 110-114 are components of the enclosure 118 (i.e., built into the enclosure), while in some embodiments, the power supplies can be installed and/or removed in a similar fashion to the compute nodes 102-106. The power supplies 110-114 can be connected to alternating current ("AC") line power, such as 120 or 240 VAC power. The power supplies 110-114 convert the provided AC power to direct current ("DC") power for use by the compute nodes 102-106 and other devices within the enclosure 118. The power supplies 110-114 may provide a one or more DC voltages suitable for further regulation by the compute nodes 102-106. For example, the power supplies 110-114 may provide 48V DC that is stepped down to a lower voltage (e.g., 3V, 1.8V, etc.) at a compute node 102 to power components of the compute node 102.

The enclosure 118 may include a cooling system to remove heat generated by the compute nodes 102-106 and other devices housed in the enclosure 118. The cooling system can include fans that draw cooler air into and/or force warmer air out of the enclosure 118.

The power controller 108 is configured to control the amount of power consumed within the enclosure 118. In at least some embodiments, the power controller 108 is a component of the enclosure 118. The power controller 118 is coupled to each of the power supplies 110-114, the compute nodes 102-106, and other power-consuming device within the enclosure, such as fans, networking devices, storage devices, etc. Embodiments of the power controller can include a processor 120, power control software 122, and power measurement circuitry 124. The power measurement circuitry 124 measures the power consumed by each power-consuming device within the enclosure 118. For example, the power measurement circuitry 124 may provide the power controller 108 with a signal representative of the current and/or voltage provided to the compute node 102. The power measurement circuitry 124 can be located within the enclosure 118 as necessary to facilitate power distribution and measurement. In at least some embodiments, some of the power measurement circuitry is located on the compute node 102 and power measurement information is communicated to the power controller 108 via an interconnection such as an Inter IC bus ("I²C") or other communication structure coupling the node 102 and the power controller 108. In other embodiments, the power control circuitry 124 that measures power consumed by the compute node 102 is completely separate from the compute node 102.

Using the power consumption measurements provided by power measurement circuitry 124, the power controller 108 determines the total power being consumed within at the enclosure at a given time. If the total power being consumed exceeds a predetermined maximum amount of power, the power controller 108 acts to reduce the power consumption within the enclosure 118.

The power controller 108 provides a plurality of power control signals. Each compute node 102-106 includes a power control input that can be used to control the power consumption of the compute node. For example, if the power control input of the compute node 102 is driven to a first state (e.g., driven to a logic "0") the compute node 102 may enter a low power state (e.g., the compute node's processor may be clocked at a lower frequency). While in the low power state, the compute node 102 may consume substantially less power (e.g., 50% less power) than the node 102 consumes when the node's control input is driven to a second state (e.g., a logic "1"). In some embodiments, the power control input may be, for example, a PROCHOT or STPCLK input.

Each of the plurality of power control signals provided by the power controller 108 connects the power controller 108 to a power control input of one of the compute nodes 102-106. The power controller 108 uses the signal to control the power consumption of the connected compute node. The power controller 108 can modulate a power control signal to cause a desired compute node 102 power consumption. For example, a power control signal driven with a 50% duty cycle (i.e., driven to first and second states for equal time intervals) by the power controller 108 may reduce the power consumption of the compute node 102 by 25%, while a power control signal driven with a 75% duty cycle (i.e., driven to first state 25% of the time and to second state 75% of the time) may reduce compute node 102 power consumption by 12.5%.

In some embodiments, the power controller 108 may be communicatively coupled to the power supplies 110-114. A serial communication link, such as I²C or another appropriate communication structure can be used. A power supply 110 may include information, for example, efficiency information, that the power controller 108 retrieves from the power supply 110. Using the retrieved information (e.g., a power supply efficiency curve), in conjunction with a measurement of power supply 110 output power provided by the power measurement circuitry 124, the power controller 108 can estimate the amount of AC power drawn into the power supply 110. Based on the amount of AC power drawn into one or more power supplies, and a maximum predetermined AC power level, the power controller 108 can throttle the compute nodes 102-106, as described above, to reduce enclosure 118 AC power consumption. In some embodiments, the power measurement circuitry 124 can measure the AC power consumption of the power supplies 110-114. In yet other embodiments, the power supply 110 can provide AC power consumption information to the power controller 108 via a communications link.

The power controller 108 may limit the power drawn by the compute nodes 102-106 based on a control loop. For example, in some embodiments a proportional integral derivative ("PID") control loop may be used. The PID control algorithm includes a number of constants (i.e., coefficients), for example, proportional gain $K_p$, integral gain $K_i$, and differential gain $K_d$. Embodiments of the power controller 108 using a PID algorithm or other control loop can automatically adjust the control loop coefficients (e.g., $K_p$ and/or $K_d$) based on the number of compute nodes 102-106 installed in the enclosure 118. Thus, the power controller 108, when informed of or detecting removal or installation of a compute node 102 can adjust the control loop coefficients to maintain proper power limiting across the number of installed compute nodes.

Because the power controller 108 can limit total enclosure 118 power consumption, compute nodes 102-106 or other power consuming devices can be added to the to the enclosure 108, even when the enclosure 118 is operating at maximum power consumption. The power controller 108 can throttle the compute nodes 102-106 to allow the addition of nodes without exceeding the power limit of the enclosure 118.

In at least some embodiments, various functions of the power controller 108 can be performed by the processor 120 via execution of the power control software 122 stored in a computer readable medium. Such power control functions can include, computing enclosure power consumption, throttling the compute nodes, determining AC power consumption, etc. The processor 120 may be, for example, a general-purpose processor, a micro-controller, a digital signal processor, etc. A computer-readable medium storing the power control software 122 for access by the processor 120 may be a semiconductor memory (e.g., random access memory ("RAM"), read-only memory ("ROM"), etc.), magnetic storage, optical storage, etc. In some embodiments, power control functions can be performed by dedicated circuitry.

FIG. 2 shows a flow diagram of a method for centralized power control in a multi-node computer system in accordance with various embodiments. Though depicted sequentially as a matter of convenience, at least some of the actions shown can be performed in a different order and/or performed in parallel. Additionally, some embodiments may perform only some of the actions shown. At least some of the operations shown can be implemented as instructions provided in the power control software 122 executed by the processor 120.

In block 202, the computer system 100 is operating and the power controller 108 is determining the amount of power being consumed individually and/or in total by compute nodes 102-106 installed in the enclosure 118. The power measurement circuitry 124 is providing signals representative of the power consumption of each compute node 102-106 to the power controller 108.

Similarly, in block 204, the power controller 108 is determining how much power is being consumed by power consuming devices 116, other than compute nodes 102-106, installed in the enclosure 118. The power measurement circuitry 124 is providing signals representative of the power consumption of each device 116 to the power controller 108. Based on the power measurements of all power-consuming devices in the enclosure, the power controller 108 determines the total power being consumed within the enclosure 118.

In block 206, the power controller 208 determines the capacity of the power supplies 110-114. The power controller 108 may base the total capacity on the determined capacity of each individual power supply. In some embodiments, the power controller 108 retrieves the capacity of a power supply 110 from the power supply 110 via a communication link coupling the power controller 108 to the power supply 110.

In block 208, the power controller 108 estimates the amount of AC current being drawn by the power supplies 110-114. Some embodiments base the estimate on the measured amount of DC power being consumed within the enclosure and efficiency information retrieved from the power supplies 110-114. In some embodiments, the power measurement circuitry 124 and/or the power supplies 110-114 may provide AC power measurements to the power controller 108.

In block 210, the power controller 108 determines whether the total power and/or current consumed within the enclosure 118 exceeds the determined capacity of the power supplies 110-114. If the total power/current consumption within the enclosure 118 exceeds the capacity of the power supplies 110-114, then, in block 216, the power controller 108 modulates a compute node power control signal causing the compute node (e.g., 102) which the power control signal connects to reduce its power consumption. By reducing the power consumption of the compute node 102, the power consumed within the enclosure 118 can be reduced to an amount less than the capacity of the power supplies 110-114.

In block 212, the power controller 108 determines whether the total power and/or current consumed within the enclosure 118 exceeds a predetermined maximum power. The predetermined maximum power can be based on a desired enclosure 118 maximum power consumption, enclosure 118 cooling capacity, etc. If the total power/current consumption within the enclosure 118 exceeds the predetermined maximum power, then, in block 216, the power controller 108 modulates a compute node power control signal causing the compute node (e.g., 102) to reduce its power consumption and thereby reduce the power consumed within the enclosure 118 to an amount less than the predetermined maximum amount.

In block 214, the power controller 108 determines whether the total AC power and/or AC current being drawn by the power supplies 110-114 exceeds a predetermined maximum AC power/current limit. If the total AC power/current being drawn by the power supplies 110-114 exceeds the predetermined maximum AC power/current limit, then, in block 216, the power controller 108 modulates a compute node power control signal causing the compute node (e.g., 102) to reduce its power consumption and thereby reduce the AC power drawn by the power supplies 110-114 to an amount less than the predetermined maximum AC power/current limit.

In block 218, the power controller 108 monitors for addition or removal of a compute node 102, or other power-consuming device to/from the enclosure 118. In at least some embodiments, when the number of compute nodes 102-106 or other power consuming devices installed in the enclosure 118 changes, the power controller 108 adjusts the coefficients of a power control loop (e.g., a PID control loop) executed by the power controller 108 in block 220.

The above discussion is meant to be illustrative of the principles and various embodiments of the present invention. Numerous variations and modifications will become apparent to those skilled in the art once the above disclosure is fully appreciated. For example, while embodiments have been discussed with relation to power measurement and control, those skilled in the art will understand that embodiments are equally applicable to current measurement and control. It is intended that the following claims be interpreted to embrace all such variations and modifications.

What is claimed is:

1. A computer system, comprising:
   an enclosure having a plurality of removable compute nodes and a centralized power controller configured to individually control an amount of power consumed by each of the plurality of removable compute nodes;
   wherein the centralized power controller provides a plurality of power control signals, each power control signal provided to and controlling, based on a duty cycle of the power control signal, the power consumption of one of the plurality of removable compute nodes, and wherein each power control signal connects to a power control input of the respective compute node, and wherein each power control signal is removably connected to the respective compute node.

2. The computer system as in claim 1, wherein the power controller comprises power measurement circuitry separate from the plurality of compute nodes that individually measures an amount of power consumed by each of the plurality of compute nodes.

3. The computer system as in claim 1, wherein the power controller controls power consumption of a given one of the plurality of compute nodes by modulating the one of the plurality of power control signals provided to the given compute node, wherein a first state of the signal configures the given compute node to operate in a reduced power state, and a second state of the signal configures the given compute node not to operate in the reduced power state.

4. The computer system as in claim 1, wherein the power controller is configured to change a coefficient of a power control loop that controls compute node power consumption based on a number of compute nodes installed in the enclosure.

5. The computer system as in claim 1, wherein the power controller is configured to retrieve power supply efficiency data from a power supply coupled to the power controller, and based on the retrieved efficiency data, determine an amount of alternating current ("AC") power drawn by the power supply.

6. The computer system as in claim 1, wherein the power controller is configured to reduce the amount of power consumed by at least one of the plurality of compute nodes based on a total power consumed by the plurality of compute nodes exceeding a predetermined limit.

7. A method, comprising:
   measuring, by a centralized power controller, an amount of power being consumed by each of a plurality of removable compute nodes installed in an enclosure of a computer system;
   determining, by the centralized power controller, whether a total amount of power being consumed in the enclosure exceeds a predetermined limit; and
   reducing, by the centralized power controller, power consumption of at least one of the plurality of compute nodes based on the determination of total power being consumed by changing a duty cycle of at least one of a plurality of power control signals provided by the centralized power controller, wherein each power control signal connects to a power control input of one of the compute nodes, and wherein each power control signal is removably connected to the respective compute node.

8. The method of claim 7, further comprising determining, by the power controller, an amount of power consumed by non-compute node devices installed in the enclosure.

9. The method of claim 7, further comprising:
determining, by the power controller, a power output capacity for each power supply providing power to the enclosure; and
reducing, by the power controller, power consumption of at least one of the plurality of compute nodes based on the determination of power supply output capacity.

10. The method of claim 7, further comprising:
retrieving power supply efficiency information from a power supply providing power to the enclosure;
determining an amount of alternating current ("AC") power drawn by the power supply based on the efficiency information; and
reducing, by the power controller, power consumption of at least one of the plurality of compute nodes based on the determination of AC power drawn by the power supply.

11. The method of claim 7, further comprising changing, by the power controller, a power control coefficient responsive to a change in the number of compute nodes installed in the enclosure.

12. A centralized power controller in an enclosure of a computer system, the centralized power controller comprising:
circuitry configured to individually measure the power consumed by each of a plurality of compute nodes removable installed in the enclosure; and
a software system that when executed causes a processor of the centralized power controller to limit an amount of power consumed by at least one of the plurality of compute nodes;
wherein the centralized power controller provides a plurality of power control signals, each power control signal provided to and controlling, based on a duty cycle of the power control signal, the power consumption of one of the plurality of removable compute nodes, wherein each power control signal connects to a power control input of the respective compute node and, wherein each power control signal is removably connected to the respective compute node.

13. The power controller of claim 12, wherein the software system causes the processor to measure an amount of current flowing into each of the plurality of compute nodes and to determine whether a total current flowing into the plurality of compute nodes exceeds a predetermined maximum amount of current.

14. The power controller of claim 12, wherein the software system causes the processor to estimate an amount of alternating current ("AC") flowing into a power supply providing power to the enclosure, to determine whether a total amount of AC current flowing into power supplies providing power to the enclosure exceeds a predetermined maximum amount, and responsive to the determination, to reduce power consumption of at least one of the plurality of compute nodes.

15. The power controller of claim 12, wherein the software system causes the processor to modify a coefficient of a power control loop based on a change in a number of compute nodes installed in the enclosure.

* * * * *

UNITED STATES PATENT AND TRADEMARK OFFICE
CERTIFICATE OF CORRECTION

PATENT NO. : 9,058,155 B2  
APPLICATION NO. : 13/375138  
DATED : June 16, 2015  
INVENTOR(S) : Darren J. Cepulis et al.

Page 1 of 1

It is certified that error appears in the above-identified patent and that said Letters Patent is hereby corrected as shown below:

In The Claims

In column 8, line 11 approx., in Claim 12, delete "node and," and insert -- node, and --, therefor.

Signed and Sealed this
Sixteenth Day of February, 2016

Michelle K. Lee
*Director of the United States Patent and Trademark Office*